United States Patent [19]
McCullough

[11] 3,914,955
[45] Oct. 28, 1975

[54] HIGH VOLTAGE CABLE SPLICING TRAILER

[76] Inventor: Orville K. McCullough, 1029 N. First St., Phoenix, Ariz. 85004

[22] Filed: Jan. 20, 1975

[21] Appl. No.: 542,355

[52] U.S. Cl. ............... 62/237; 62/271; 62/419; 165/41; 165/42; 62/239
[51] Int. Cl.² ........................................ B60H 3/04
[58] Field of Search ............ 62/239, 419, 271, 237; 165/41, 42

[56] References Cited
UNITED STATES PATENTS

| | | | |
|---|---|---|---|
| 2,439,487 | 4/1948 | Reilly | 165/42 |
| 2,791,401 | 5/1957 | Horslem | 165/42 |
| 3,320,765 | 5/1967 | Chapple | 62/239 |
| 3,672,445 | 6/1972 | Carson | 165/42 |
| 3,799,244 | 3/1974 | Strauss | 165/42 |
| 3,859,816 | 1/1975 | McDonald | 62/239 |

*Primary Examiner*—William J. Wye
*Attorney, Agent, or Firm*—Warren F. B. Lindsley

[57] ABSTRACT

A mobile trailer structure designed, constructed and equipped to provide a completely self-contained facility for the environmental control necessary in the splicing and servicing of high voltage underground cable installations.

7 Claims, 4 Drawing Figures

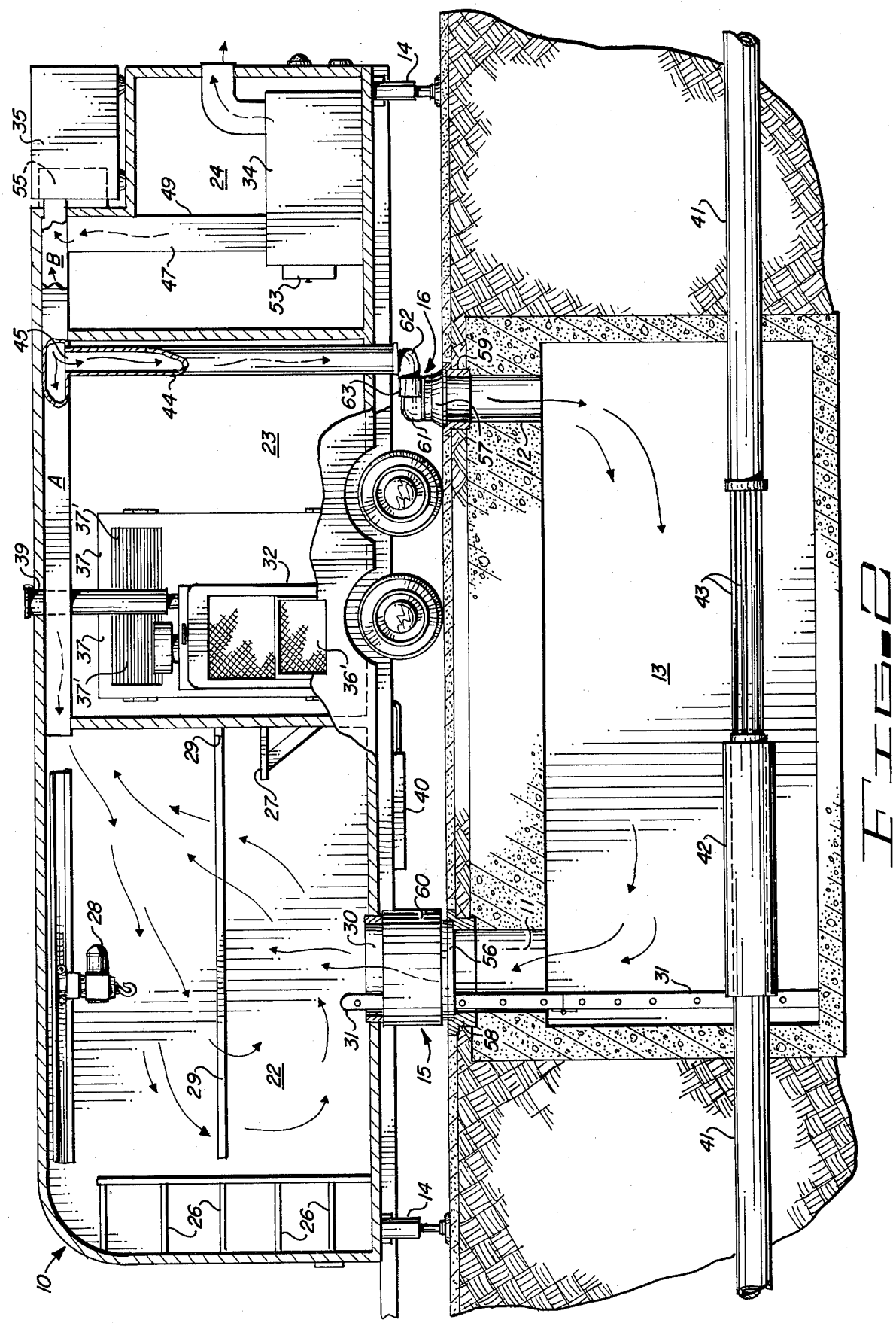

HIGH VOLTAGE CABLE SPLICING TRAILER

BACKGROUND OF THE INVENTION

This invention pertains to completely self contained, mobile trailer units moved to, stabilized and connected in air and water tight relationship to any man-hole opening of an under-ground cable servicing tunnel that needs attention and is utilized to provide a controlled temperature and humidity level for the work in both the tunnel and work area of the trailer for extended periods of time, regardless of outside atmospheric or ground conditions.

FIELD OF THE INVENTION

This invention is particularily directed to mobile trailer units that are completely equipped with power generating and environmental control facilities that may be easily moved as a single, self contained unit to the job-site or tunnel of under-ground cable installations, connected thereto and utilized to control the atmospheric conditions in the tunnel and work area of the trailer.

DESCRIPTION OF THE PRIOR ART

Heretofore, the environmental control necessary in the splicing and servicing of high voltage underground cable installations, has been accomplished by the use of various kinds of portable equipment such as air-conditioners, dehumidifiers, blowers, exhaust fans and other separate but related apparatus. This equipment is usually transported to the job-site or underground tunnel where the work is to be performed by truck or other conveyance where it is connected to the manhole openings of the tunnel and some remote electrical power source to function and provide the environmental control required.

The time required for loading, transporting and the installation of such equipment and the subsequent removal of the same from the job-site or tunnel, is excessive and adds to the labor cost of the servicing project. Because most of this equipment is installed outside of the work-area or underground tunnel where it is exposed to all kinds of weather conditions detrimental to the same, delays or complete work stoppages of the project are often encountered resulting in further additional expense.

In view of the many disadvantages and unnecessary expenses encountered when such portable equipment is utilized, a new and improved, completely self-contained facility which completely eliminates or greatly reduces the disadvantages of presently utilizing equipment is provided.

SUMMARY OF THE INVENTIONN

It is therefore, one object of this invention to provide an improved facility which is capable of providing the environmental control necessary in the splicing and servicing of high voltage underground cable installations.

Another object of this invention is to provide an improved completely self-contained facility in the form of a mobile trailer unit, which when associated with an underground cable servicing tunnel is capable of providing suitable atmospheric conditions in the work areas of the tunnel and the trailer for uninterrupted periods of time, regardless of outside weather conditions.

A further object of this invention is to provide a mobile trailer unit having a work-area and other enclosures which contain specific elements of a complete, electrical powered environmental control facility or system which when associated with the access openings of an underground cable servicing tunnel, provide continual and complete environmental control of the air being circulated through the tunnel and the work area of the trailer.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

FIG. 2 is a longitudinal sectional view through the trailer unit and an underground, high voltage cable servicing tunnel illustrating one method of associating the environmental control equipment of the contained system and the work-area of the trailer with the access openings in the roof of the servicing tunnel.

DESCRIPTION OF THE PREFERRED EMBODIMENT

Figure 1:
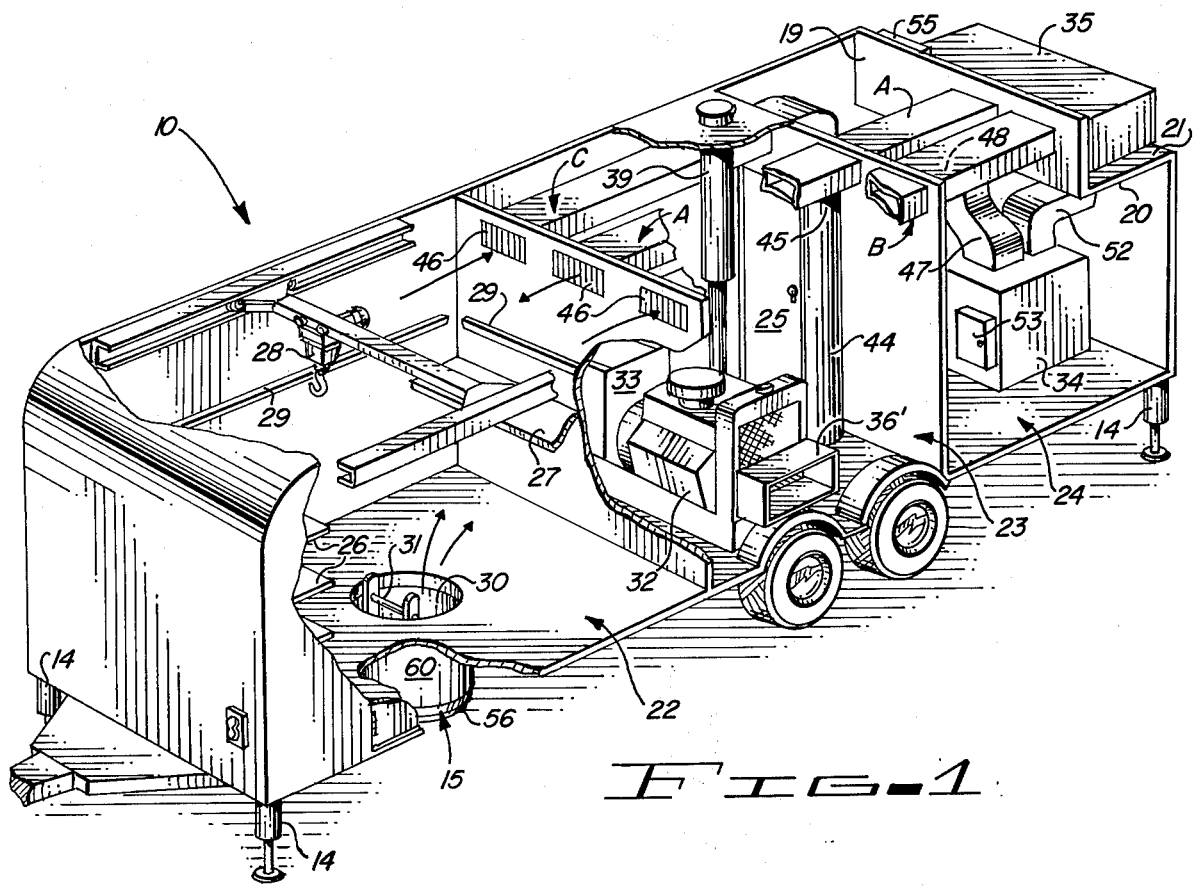
FIG. 1 is a perspective view of the mobile trailer unit of this invention with portions of the roof, left side wall and floor broken away to show the interior arrangement and the installed relationship of the equipment that constitutes the self contained facility.
Figure 3:
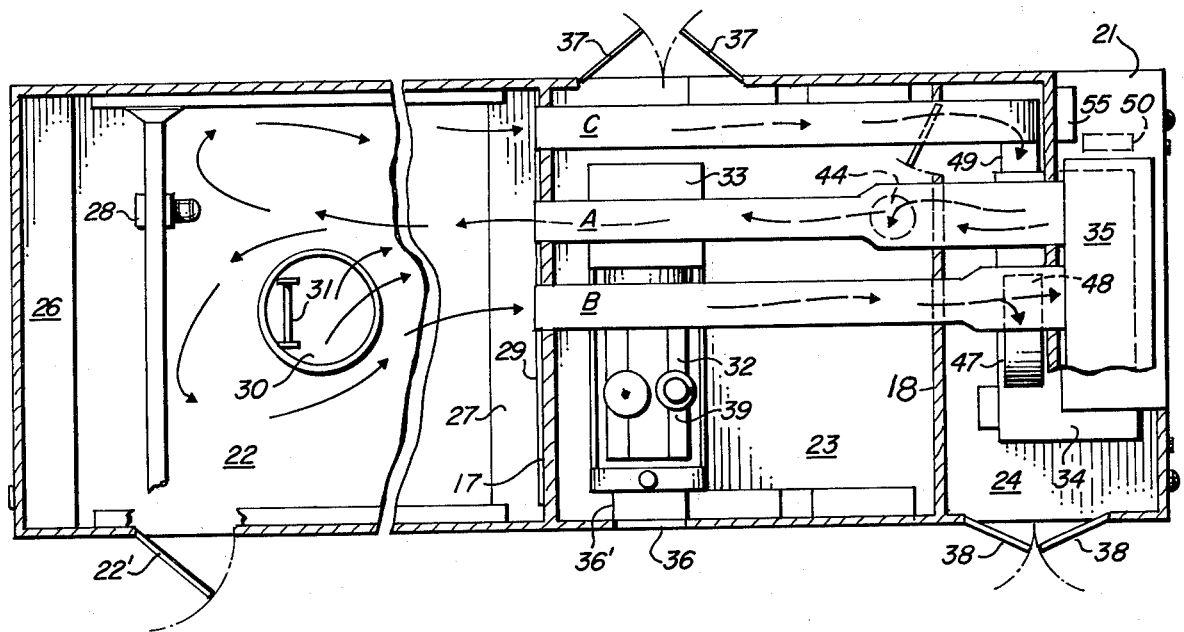
FIG. 3 is a top plan, sectional view of the trailer with its roof removed showing the arrangement of the transverse partition walls that separate the work area from the equipment areas, the access openings thereto, and the ducting arrangement for connecting the elements of the environmental control system to the work area of the trailer, the underground servicing tunnel and the atmosphere.

Referring more particularly to the drawings by characters of reference, FIGS. 1 and 2, disclose a completely assembled and equipped, high voltage cable splicing trailer 10 as it would appear when positioned, stabilized and connected to the open manhole access openings 11 and 12, respectively, of an underground cable splicing and servicing tunnel 13. Hydraulic jacks 14 secure and locate the four corners of the trailer. Adjustable couplings or sleeves 15 and 16 connect the man-hole access openings 11 and 12 of the tunnel to openings in the trailer 10 as hereinafter explained.

The body, frame work, under-carriage or chassis frame, tow-bar and rubber tired road wheels of the trailer 10 are conventional except that these components may be made more sturdy than their counterparts in a conventional mobile home or travel trailer if necessary to withstand the stresses imposed thereon by the weight and vibrations created by the apparatus carried in the trailer.

The exterior and interior partition walls, ceiling and floor of the trailer are provided with suitable insulation and moisture barrier material. The access doors are weatherstripped to maintain the desired temperature in the trailer and to prevent excessive moisture laden outside air from entering the interior thereof. The interior of the trailer is preferably divided by transverse partition walls 17 and 18, partial transverse partition wall 19 and dropped ceiling portion 20, which together form a sturdy platform 20 at the rear upper portion of the trailer. As shown the trailer is divided into three separate compartments or rooms namely front work area or room 22, middle engine, generator room 23, and rear dehumidifier or drier room 24, the latter two of which are connected by an access door 25.

The front work area or room 22 is provided with an access door 22' and suitable interior fittings including shelving 26, a work bench 27, an overhead traveling hoist 28, 110 volt plug-in strips 29 and a centrally located, cylindrical access opening 30 in the floor. The diameter of opening 30 is approximately the same as the front man-hole access opening 11 in the ceiling of the underground servicing tunnel 13 which when connected together by the adjustable couplings or sleeves 15 will provide sufficient space for the entry and exit of a foldable ladder 31 used to gain access to the tunnel and which may be raised, folder and stored in the work area 22 when not in use.

The engine-generator room 23 connected by a passage and access door 25 to the rear drier room 24 is large enough to provide sufficient space for the transversely installed diesel engine 32 and its associated electric generator 33. The generator has sufficient capacity to provide all the electric power requirements necessary for the operation of the six hundred cubic foot capacity dehumidifier or drier 34 which is installed transversely to the length of the trailer in the adjoining rear drier room 24, a four ton air conditioning unit 35 which is mounted and installed on the upper rear platform 21 on the outside of the trailer, and all other electric power requirements such as interior and exterior lights and power tools that may be used in the work project.

The engine-generator room 23 is provided with an air-intake 36 which communicates with the radiator of the diesel engine 32 through an extensiion 36' and a pair of open out access doors 37. The doors 37 have adjustable louvered openings 37' that together with a pair of open out access doors 38 having adjustable louvered openings (not shown) located on the opposite side of the trailer in the drier room 24, and the access door 25 between the two rooms, provide a means for continuous air purging of the adjoining rooms under operational conditions. The diesel engine 32 is also provided with the usual exhaust stack 39 having a required aftburner that projects through the roof of the trailer to permit only a minimal amount of obnoxious gasses from the engine to pass into the atmosphere. One or more fuel tanks 40 having sufficient fuel storage capacity to permit approximately fifty five hours of operation of the diesel engine 32 and the associated electric generator 33 at its rated load and together with piping is secured to the underside of the floor and frame of the trailer.

The splicing and servicing of high voltage underground cables is usually performed in moisture sealed masonry enclosed areas such as the underground tunnel 13, through the walls of which the encased cables 41 pass in moisture sealed relationship. The portion of the encased cables inside of the working area or tunnel is provided with a slidable sleeve member that can be moved to one side to expose the high voltage cables 43 so that splicing or routine servicing may be accomplished.

Because it is imperative that the splicing or servicing of high voltage cables be performed in a low humidity atmosphere, it is required that the walls, ceiling and floor of the underground tunnel 13 be substantially sealed against the entry of moisture. The adjustable couplings or sleeves 15 and 16 that connect the manhole access openings 11 and 12 of the tunnel to the respective access openings 30 in the trailer work area 22 and the cylindrical duct 44 which extends vertically in sealed relationship through the floor of the engine-generator room 23 seal tunnel 13 from the entry of large quantities of moisture or water in the event of high humidity outside atmospheric conditions or even possible flood conditions. Cylindrical duct 44 is connected at its top end to a circular opening 45 in the air-conditioning outlet duct A so that the humidity and temperature of the circulating air in the underground tunnel 13 and the work area 22 of the trailer can be controlled and maintained at the desired and necessary working level during the entire work project, regardless of the outside atmospheric conditions. The use of the highly efficient dehumidifier or drier 34, the air conditioner 35 and the associated ducts provide a means for the circulation of processed air through the system and the expulsion of hot moisture laden air therefrom.

The dehumidifier or drier 34 is preferably of a heavy duty industrial type which employs circular beds of desiccant material that provides for continuous physical adsorption and removal of water vapor in the air stream by the continuous rotation of the desiccant beds through two separate sealed compartments. In one of the compartments the desiccant material dehumidifies the air passing therethrough and in the other compartment the desiccant material is regenerated and made ready for re-use by the application of heated air. The excess hot, moisture laden air is exhausted through ducting to the atmosphere.

To accomplish their function of supplying a continual forced circulation of temperature controlled dehumidified air through the sealed underground tunnel 13, the sealed couplings or sleeves 15 and 16 and the work area 22 of the trailer, a suitable ducting system is provided. The duct system includes three horizontal, ceiling mounted ducts A, B, and C that extend from the air-conditioner 35 and the dehumidifier 34 at ceiling level into the work area 22 of the trailer through suitable dampers or adjustable louvers 46 mounted at their end openings in the rear wall of the work area or room 22.

The main outlet duct A which delivers processed or conditioned air from air conditioner 35 to the work area 22 is preferably larger at its receiving end than at its outlet end. This duct is adapted to initially receive approximately 1500 cubic feet per minute (C.F.M.) of forced air from the air-conditioner which is reduced to 900 C.F.M. at its outlet in the work area. Approximately 600 C.F.M. of the forced air is diverted from the outlet duct A into the circular opening 45 of the vertical cylindrical duct 44 and thence through the coupling or sleeve 16 into the underground servicing tunnel 13 from which it exits through the coupling or sleeve 15 and the access opening 30 in the floor of the work area 22. At this point the air from the air conditioner mingles with the conditioned air circulating therein where it is again divided and returned to the air-conditioner 35 and the dehumidifier 34 to be reprocessed and recirculated through the system in a manner which will be further explained.

The return air duct B is also preferably larger at its outlet end which connects to the air-conditioner unit 35 because it is adapted to pick up and return approximately 900 C.F.M. of air, bearing a slight amount of moisture from the work area 22. This air mingles with 600 C.F.M. of very dry air being delivered from the process side of the dehumidifier 34 through the vertically extending duct 47 and opening 48 in the return air duct B to return approximately 1500 C.F.M. of air to the air-conditioner to be again recirculated.

Figure 4:
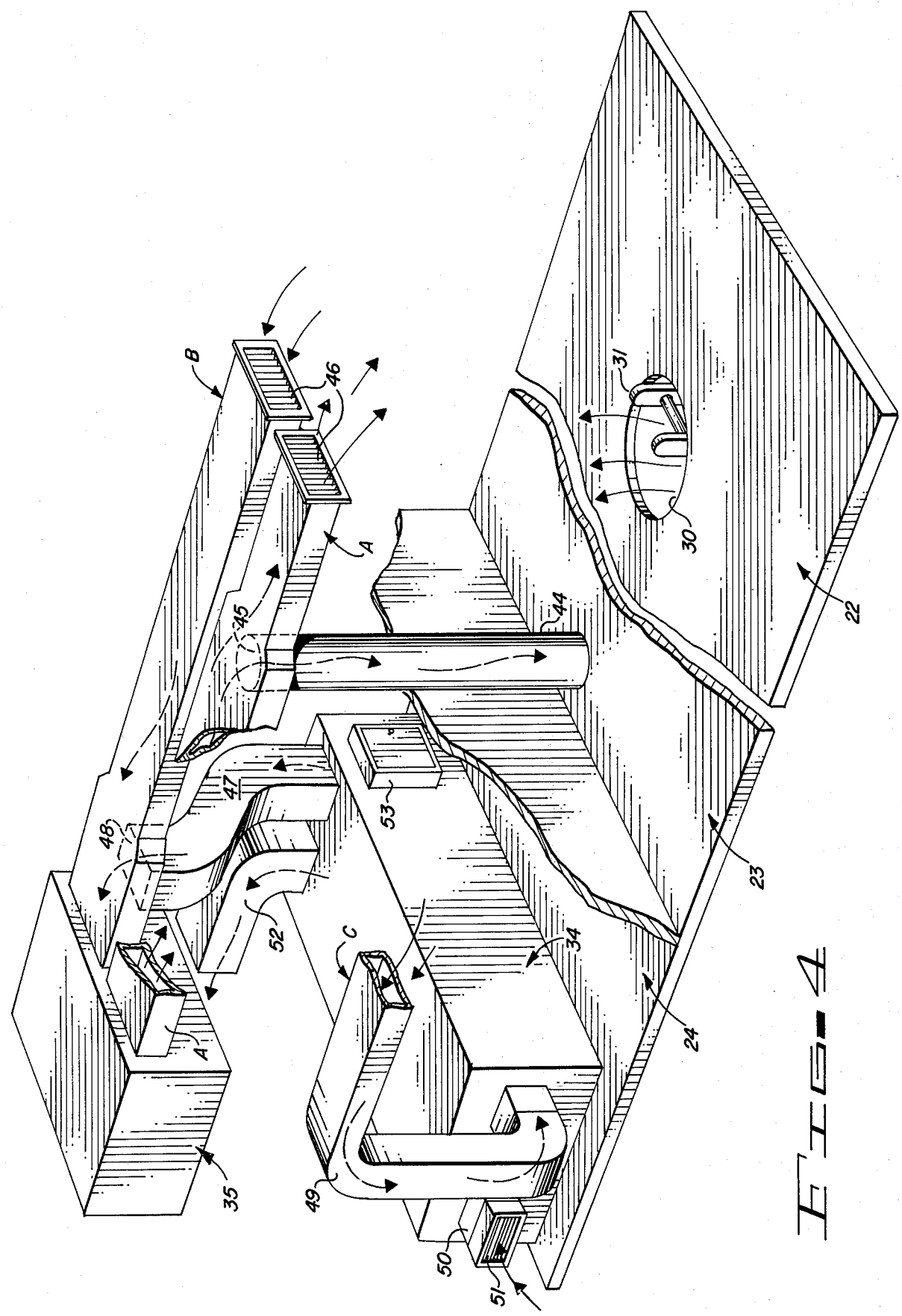
FIG. 4 is a schematic perspective view, clearly illustrating the arrangement of duct system in the trailer with their respective relationship to the dehumidifier and air conditioning elements of the environmental control system and the flow patterns of dry reactivated process air and wet exhaust air in the system.

The return air duct C is adapted to pick-up approximately 600 C.F.M. of moisture bearing air from the work-area 22 and returns it to the dehumidifier 34 through a vertically depending section 49 having an angled end which is connected to the processing or drying side of the dehumidifier to be returned as dry air to the circulating system as described above. A short length of duct 50 having a suitable damper or adjustable louvers 51 at its intake end opening into the rear dehumidifier room 24, as shown in FIG. 4, is provided with an electrical heater coil (not shown). Duct 50 is connected at its other end to the reactivation side or chamber of the dehumidifier 34 so that a controlled amount of heated air is pulled through that chamber by the action of a suitable exhaust fan (not shown) to thus reactivate the desiccant material in the regenerating beds and causes the hot moisture laden air to be exhausted to the atmosphere through a suitable outlet duct 52 which is connected to the opposite end of the reactivation chamber of the dehumidifier.

It should be noted at this time that the amount, velocity, temperature and degree of humidity of the air being forced or drawn through the underground tunnel 13, the work area 22 and the described duct system may be accurately controlled by the setting of electrical control devices such as thermostats, humidistats, switches etc; contained in a control box 53 on the side of the dehumidifier 34 in the work area 22 of the trailer. The complete circulation system also may be manual adjusted by damper 54 in the vertical duct 47, damper 51 in the short length of duct 51 and the adjustable louvers in the outlet and inlets of the ducts A, B, and C.

It should be noted that in case of breakdown or other servicing requirements of the diesel engine 32 or generator 33, the complete system may be operated by attaching a line from an outside electrical power source to a weatherproof auxillary electrical service box or entrance 55 located on the exterior rear vertical wall 19 and platform 21 of the trailer.

To be assured that the mobile, completely self-contained, high voltage cable splicing trailer 10 can perform its function as described, regardless of inclement weather or even flood conditions, in the area where the work is to be performed, it is imperative that air and water tight connections such as removable couplings 15 and 16 be used. These connections are designed to compensate for variations in the size of or distance between the manhole openings 11 and 12 and the ceiling of the underground tunnel 13.

To this end both the front and rear connections 15 and 16 employ commercially available manhole shields 56 and 57 of the proper size and diameter which are provided with inflatable rubber sealing rings that are similar to the tube of a bicycle tire. These tubes are adapted to bear against the circular counterbores of steel rings 58 and 59 previously inserted in sealed relationship in the top ends of the manhole access openings 11 and 12 of the tunnel 13. These sleeves may be stacked one upon the other in air and water tight sealed relationship and connected to a similar sleeve in the cylindrical access opening 30 in the floor of the work-area 22 of the trailer or they may be joined in sealed relationship by a flexible connecting member 60 as shown in FIGS. 1 and 2 of the drawings, to provide for any variation in the distance between the floor of the trailer and the surface of the roadway or ground over which the trailer is parked and leveled by hydraulic jacks 14.

The rear connection 16 from the lower end of the cylindrical duct 44 which projects down through the floor of the engine-generator room 23 of the trailer, is connected to the counterbore of a properly sized steel ring 59. Ring 59 is inserted in sealed leak-proof relationship in the top end of the rear manhold opening 12 in the ceiling of the tunnel 13 by a similar manhole sleeve 57 to which an "L" shaped hollow fitting 61 has been attached in sealed relationship thereto. A similar L-shaped hollow fitting 62 is rotatable about the bottom end at the duct 44 to which it is attached and is rotated to provide and in-line arrangement between the two fittings 61 and 62 regardless of any angular or distance variation between the centers of the access opening 12 in the tunnel 13 and the cylindrical duct 44. Fittings 61 and 62 are then connected together by a suitable sized flexible connecting member 63 to complete the air and water-tight duct system of the high-voltage cable splicing trailer 10.

Although but one embodiment of the invention has been shown and described, it should be apparent to those skilled in the art that various changes and modifications may be made therein without departing from the spirit of the invention or from the scope of the appended claims.

What is claimed is:

1. A self contained trailer for providing environmental control for underground electrical installations comprising:

a trailer having at least a pair of separate compartments, two of said compartments having openings for communicating each with a different spaced manhole opening of the underground installations, one of said compartments housing air conditioning means, and coupling means one for each of the manhole openings for interconnecting in air tight arrangement each of said openings in said compartments with a different one of the spaced manhole openings, said airconditioning means withdrawing air from the underground installation through one of the manhole openings, airconditioning it in said one of said compartments and returning the air to the underground installation through the other manhole opening in a recirculating and continuous manner.

2. The self contained trailer set forth in claim 1 wherein:

said airconditioning means withdraws air from the underground installation through one of the manhole openings, into the atmosphere of one of the compartments, said means comprising airconditioning and dehumidifying means, and duct means for interconnecting the atmosphere of said one of said compartments with said airconditioning and dehumidifying means and said other manhole opening.

3. The self contained trailer set forth in claim 2 wherein:
said duct means further comprises a duct for connecting airconditioned and dehumidified air into the atmosphere of said one of said compartments.

4. The self contained trailer set forth in claim 1 wherein:
said trailer comprises three separate compartments,
one of said compartments housing electrical generating means, a second one of said compartments housing airconditioning means, and the third compartment comprising a work area directly above one of said manhole openings.

5. A self contained trailer for providing environmental control for underground electrical installations comprising:
a trailer having three separate compartments,
first and second compartments having openings for communicating each with a different spaced manhole opening of an underground installation,
coupling means one for each of said openings for interconnecting in air tight arrangement each of the openings of said first and second compartments with a different one of the spaced manhole openings,
one of said compartments housing airconditioning means,
another of said compartments housing electrical generating means, and
a further one of said compartments providing an airconditioned work area,
said airconditioning means withdrawing air from the underground installation through one of the manhole openings, airconditioning it in said one of said compartments and returning the air to the underground installation through the other manhole opening in a recirculating and continuous manner, and
duct for interconnecting the atmosphere of said further one of said compartments with said airconditioning means.

6. The self contained trailer set forth in claim 5 wherein:
said airconditioning means withdraws air from the underground installation through one of the manhole openings into the atmosphere of said further one of said compartments and wherein said airconditioning means comprises a dehumidifying means,
duct means for interconnecting the atmosphere of said one of said compartments with said airconditioning means and said other manhole opening.

7. The self contained trailer set forth in claim 6 wherein:
said airconditioning means comprises a blower means.

* * * * *